US009107226B2

(12) United States Patent
Calcev et al.

(10) Patent No.: US 9,107,226 B2
(45) Date of Patent: Aug. 11, 2015

(54) METHOD AND SYSTEM FOR HANDLING CONGESTION IN A COMMUNICATIONS SYSTEM

(75) Inventors: George Calcev, Hoffman Estates, IL (US); Bin Chen, Schaumburg, IL (US); Erik Colban, San Diego, CA (US); George Cummings, Gilbert, AZ (US); Ronald Xuzhuang Mao, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 513 days.

(21) Appl. No.: 13/415,279

(22) Filed: Mar. 8, 2012

(65) Prior Publication Data

US 2012/0230302 A1  Sep. 13, 2012

Related U.S. Application Data

(60) Provisional application No. 61/451,554, filed on Mar. 10, 2011.

(51) Int. Cl.
*H04W 4/00* (2009.01)
*H04W 74/08* (2009.01)
*H04W 72/04* (2009.01)

(52) U.S. Cl.
CPC ............ *H04W 74/085* (2013.01); *H04W 4/005* (2013.01); *H04W 72/04* (2013.01); *H04W 74/0866* (2013.01)

(58) Field of Classification Search
USPC .................... 370/229–258; 455/500, 509, 510
See application file for complete search history.

(56) References Cited

U.S. PATENT DOCUMENTS

| | | | | |
|---|---|---|---|---|
| 5,615,212 A | * | 3/1997 | Ruszczyk et al. | 370/433 |
| 8,417,273 B2 | * | 4/2013 | Koo et al. | 455/509 |
| 2006/0153131 A1 | * | 7/2006 | Kang et al. | 370/329 |
| 2006/0203712 A1 | * | 9/2006 | Lim et al. | 370/208 |
| 2008/0310384 A1 | * | 12/2008 | Shim et al. | 370/342 |
| 2009/0125957 A1 | * | 5/2009 | Singh et al. | 725/111 |
| 2009/0154401 A1 | * | 6/2009 | Arora et al. | 370/329 |

(Continued)

FOREIGN PATENT DOCUMENTS

CN        1882159 A        12/2006

OTHER PUBLICATIONS

LaMaire et al, Analysis of a Novel Feedback Scheme to Increase Throughput in Multiple Access Radio Systems,1998, IEEE, 7 pages, 1089-1095.*

(Continued)

*Primary Examiner* — Mounir Moutaouakil
(74) *Attorney, Agent, or Firm* — Slater & Matsil, L.L.P.

(57) ABSTRACT

An apparatus for managing contention in a communications system, the apparatus comprising a processor and a non-transitory computer readable storage medium storing programming for execution by the processor. The programming may include instructions to receive a ranging code from a device in a ranging channel, the ranging code corresponding to a current ranging attempt. The programming may further include instructions to broadcast a message acknowledging reception of the ranging code. The programming may further include instructions to receive a ranging request message from the device, the ranging request message comprising a ranging retries parameter that specifies a number of ranging retries that the device performed during the current ranging attempt.

15 Claims, 7 Drawing Sheets

(56) References Cited

U.S. PATENT DOCUMENTS

| | | | | |
|---|---|---|---|---|
| 2010/0080135 | A1* | 4/2010 | Ishii et al. | 370/252 |
| 2010/0135210 | A1* | 6/2010 | Kim et al. | 370/328 |
| 2010/0157820 | A1* | 6/2010 | Cheng et al. | 370/252 |
| 2010/0296477 | A1* | 11/2010 | Hason et al. | 370/330 |
| 2010/0323737 | A1* | 12/2010 | Koo et al. | 455/509 |
| 2011/0090856 | A1* | 4/2011 | Cho et al. | 370/329 |
| 2013/0336223 | A1* | 12/2013 | Huang et al. | 370/328 |
| 2013/0343323 | A1* | 12/2013 | Kang et al. | 370/329 |
| 2014/0056249 | A1* | 2/2014 | Park et al. | 370/329 |
| 2014/0348117 | A1* | 11/2014 | Zhang et al. | 370/329 |

OTHER PUBLICATIONS

Chen, Bin, et al., "Handling Normal Operation Congestion in M2M Networks," IEEE Draft 802.16, Broadband Wireless Access Working Group, Mar. 17, 2011, 4 pages.

International Search Report and Written Opinion received in International Application No. PCT/CN2012/072199, mailed Jun. 14, 2012, 12 pages.

"IEEE Standard for Local and metropolitan area networks Part 16: Air Interface for Broadband Wireless Access Systems," IEEE Computer Society and the IEEE Microwave Theory and Techniques Society, IEEE Std. 802.16™-2009, 2082 pages.

"Draft Amendment to IEEE Standard for WirelessMAN—Advanced Air Interface for Broadband Wireless Access Systems—Enhancements to Support Machine-to-Machine Applications," IEEE P802.16b/D2, Jan. 2012, 82 pages.

"Draft Amendment to IEEE Standard for Air Interface for Broadband Wireless Access Systems—Enhancements to Support Machine-to-Machine Applications," IEEE P802.16p/D3, Jan. 2012, 55 pages.

Zhuang, Jeff, et al. "IEEE 802.16m Evaluation Methodology Document (EMD)," IEEE 802.16 Broadband Wireless Access Working Group, IEEE 802.16m-08/004r2, Jul. 3, 2008, 162 pages.

"Amendment to Standard for Local and Metropolitan Area Networks—Part 16: Air Interface for Broadband Wireless Access Systems—Enhancements to Support Machine-to-Machine Applications," Amendment to IEEE Standard 802.16-2009, P802.16p, Jul. 27, 2010, 2 pages.

NIST, "Consolidated NIST Wireless Characteristics Matrix V5", Oct. 25, 2010.

* cited by examiner

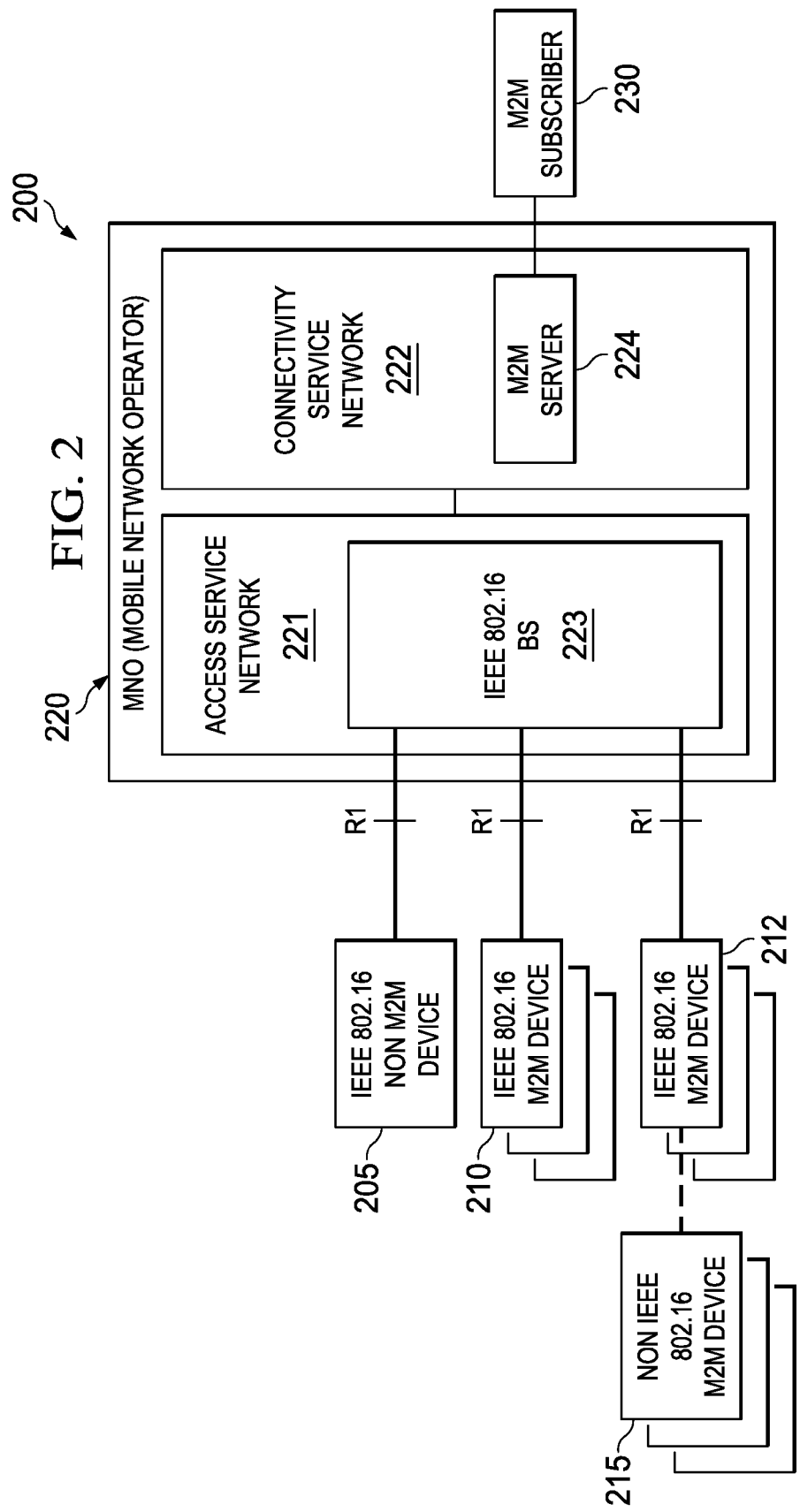

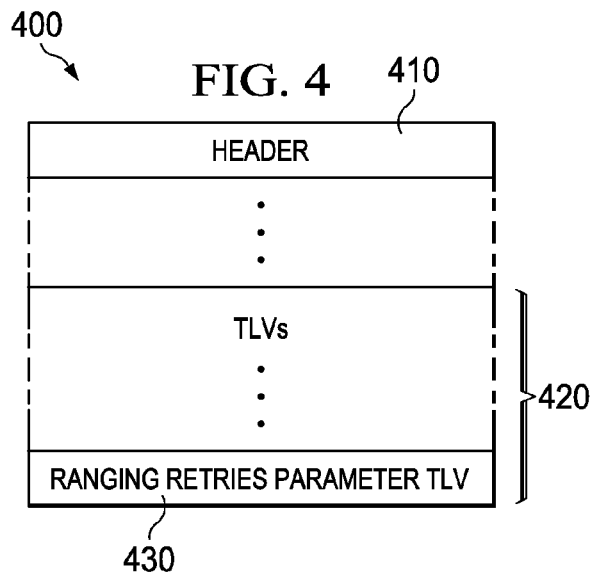
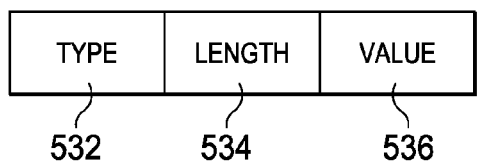
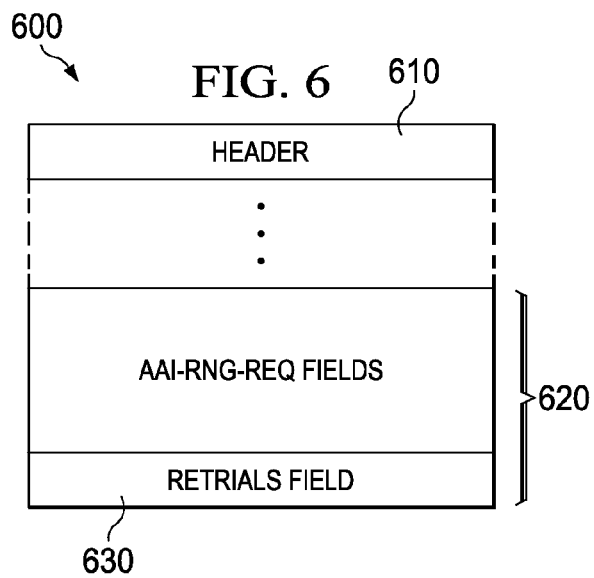

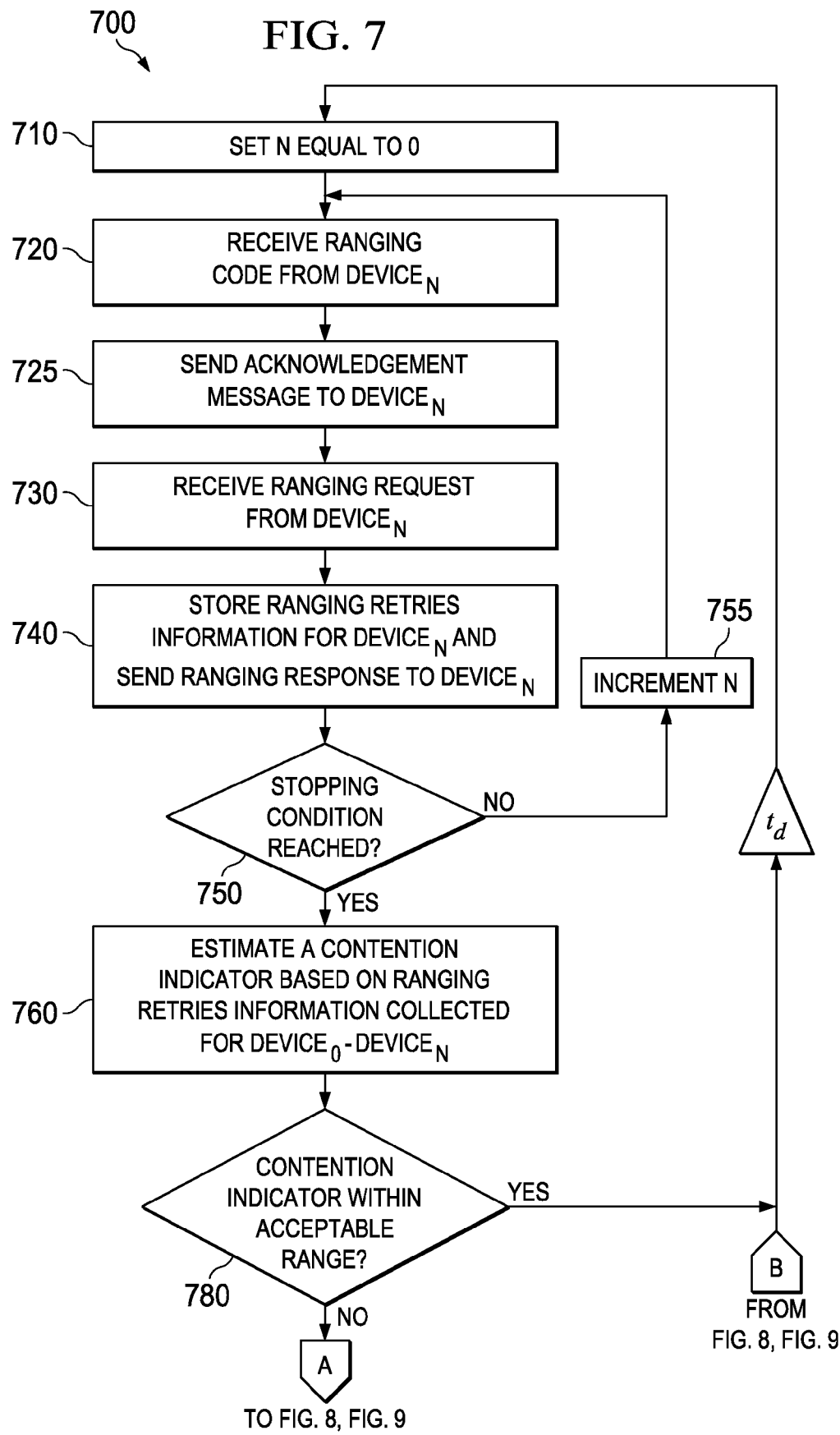

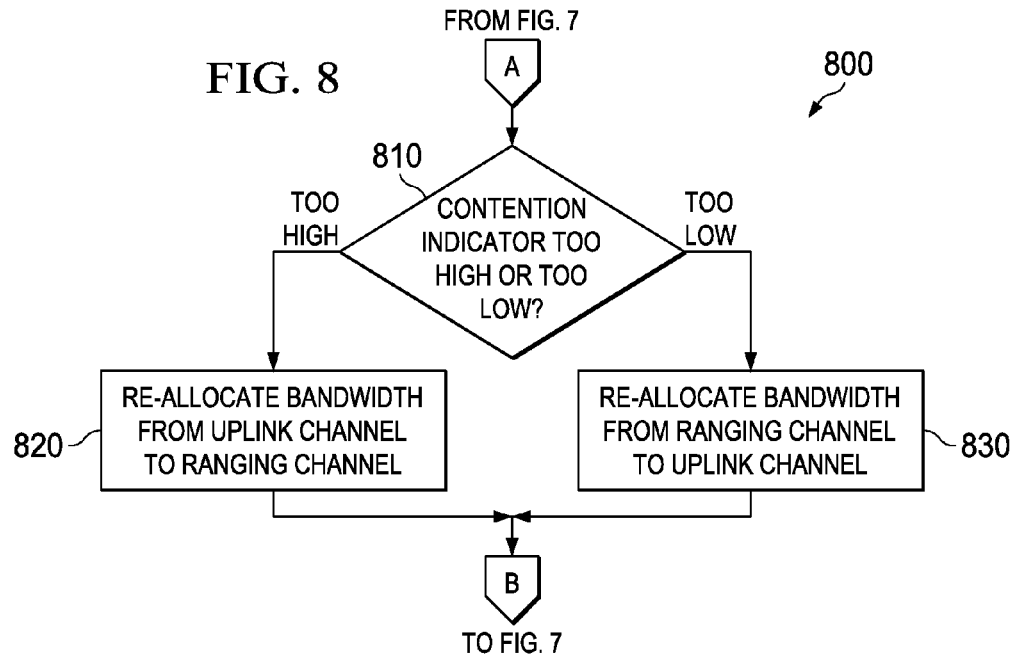
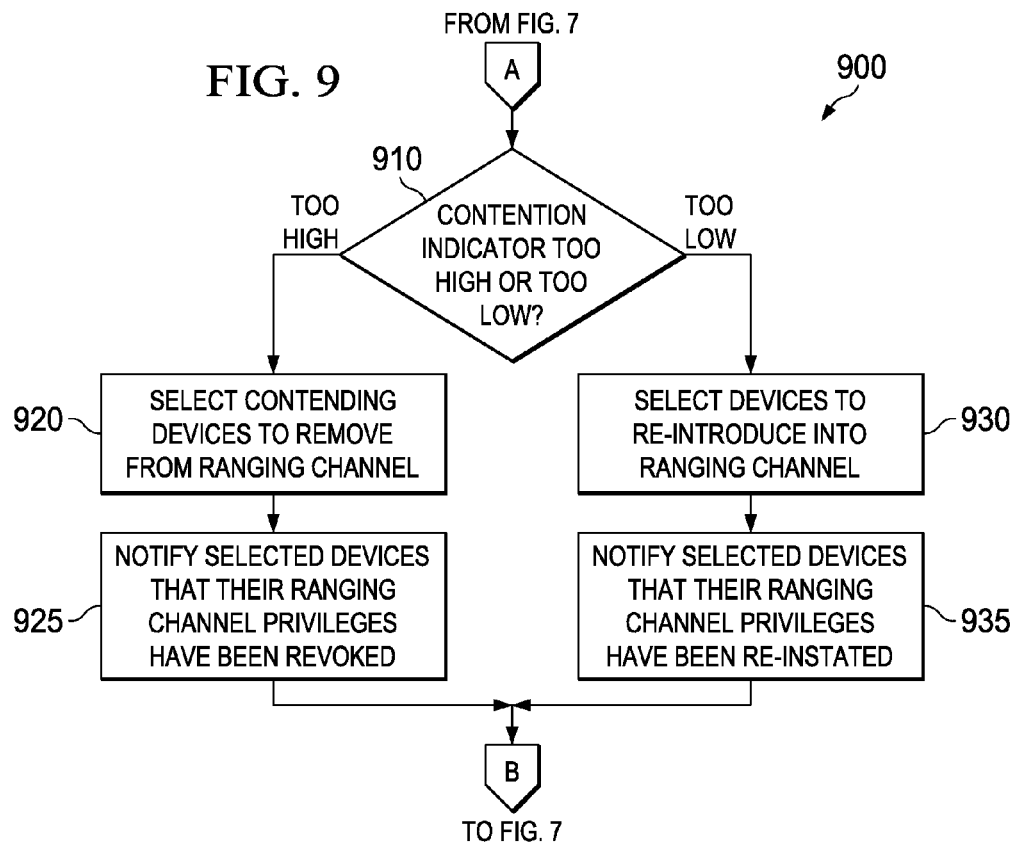

METHOD AND SYSTEM FOR HANDLING CONGESTION IN A COMMUNICATIONS SYSTEM

This patent application claims priority to U.S. Provisional Application No. 61/451,554, filed on Mar. 10, 2011, entitled "Method and System for Handling Congestion in M2M Networks," which is incorporated by reference herein as if reproduced in its entirety.

TECHNICAL FIELD

The present invention relates generally to communications systems and methods, and, in particular embodiments, to a machine-to-machine application based congestion control system and method.

BACKGROUND

Machine-to-Machine (M2M) service generally refers to technologies that allow communication between a pair of devices (or between a device and a server) through an access network without any human interaction. For example, an M2M device (e.g., a sensor or meter) may relay data (e.g., inventory level, etc.) through a network to an application (e.g., a software program) that translates the captured event into meaningful information (e.g., items that need to be restocked). Notably, the efficient management and support of M2M communication is a stated objective of Worldwide Interoperability for Microwave Access (WiMAX) standards, including those defined by Institute of Electrical and Electronics Engineers (IEEE) 802.16 and IEEE 802.16m, both of which are incorporated herein by reference as if reproduced in their entireties. Networks operating under IEEE 802.16 may be referred to herein as "legacy WiMAX networks," while networks operating under IEEE 802.16m may be referred to herein as "Advanced Air Interface (AAI) WiMAX networks." M2M communication may also be supported by other wireless communication protocols, including those defined by the third generation partnership project (3GPP) Wideband Code Division Multiple Access (W-CDMA)/High Speed Downlink Packet Access (HSDPA) standard and the 3GPP Long Term Evolution (LTE) standard.

SUMMARY OF THE INVENTION

These and other problems are generally solved or circumvented, and technical advantages are generally achieved, by preferred embodiments of the present invention which describe an apparatus and method for managing contention in M2M networks. Although the below descriptions are discussed largely in the context of M2M devices, aspects of this disclosure may be applicable to any device that operates in a ranging or contention channel.

In accordance with an embodiment, an apparatus for managing contention in a communications system, the apparatus comprising a processor and a non-transitory computer readable storage medium storing programming for execution by the processor. The programming may include instructions to receive a ranging code from a device in a ranging channel, the ranging code corresponding to a current ranging attempt. The programming may further include instructions to broadcast a message acknowledging reception of the ranging code. The programming may further include instructions to receive a ranging request message from the device, the ranging request message comprising a ranging retries parameter that specifies a number of ranging retries that the device performed during the current ranging attempt.

In accordance with another embodiment, a method for operating a BS in a network, the method comprising receiving, by the BS, a ranging request (RNG-REQ) message from a mobile-to-mobile (M2M) device in a ranging channel of the network, the RNG-REQ message comprising a ranging retries parameter specifying a number of ranging retries that the M2M device performed during a current ranging attempt.

In accordance with yet another embodiment, a method for operating a BS in a network, the method comprising receiving, by the BS, an AAI ranging request (AAI-RNG-REQ) message from a mobile-to-mobile (M2M) device in a ranging channel of the network, the AAI-RNG-REQ message comprising a retrials field that specifies a number of failed trials in a current ranging process of the M2M device.

In accordance with yet another embodiment, a method for managing contention in a communications system, the method comprising receiving a ranging request message from a device, the ranging request message comprising a ranging retries parameter that specifies a number of ranging retries that the device performed during a current ranging attempt; and estimating a contention indicator based at least in part on the ranging retries parameter, where the contention indicator is indicative of a level of contention in a ranging channel.

In accordance with yet another embodiment, an apparatus for reserving uplink channel resources in a communication network, the apparatus comprising a processor; and a non-transitory computer readable storage medium storing programming for execution by the processor. The programming may include instructions to attempt a ranging code transmission in a ranging channel, the ranging code transmission being re-attempted until an acknowledgement message is received from a base station. The programming may further include instructions to receive the acknowledgement message from the base station. The programming may further include instructions to transmit a first ranging request message to the base station, the first ranging request message comprising a ranging retries information that specifies a number of times that the ranging code transmission was attempted.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates a block diagram of an embodiment of a WiMAX compliant communications system for supporting M2M communication;

FIG. 4 illustrates a diagram of an embodiment of a ranging request message;

FIG. 5 illustrates a diagram of an embodiment of a ranging retries type-length-value (TLV);

FIG. 6 illustrates a diagram of another embodiment of a ranging request message;

FIG. 7 illustrates a flowchart of an embodiment of a method for managing contention in a ranging channel;

FIG. 8 illustrates a flowchart of an embodiment of a method for adjusting a ratio of contending devices to available timeslots;

FIG. 9 illustrates a flowchart of another embodiment of a method for adjusting a ratio of contending devices to available timeslots;

DETAILED DESCRIPTION OF ILLUSTRATIVE EMBODIMENTS

Figure 1:
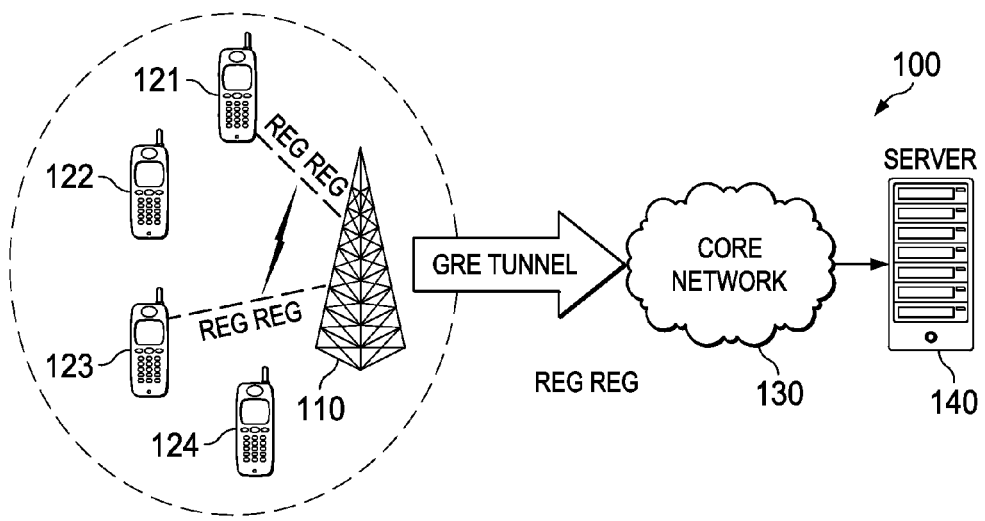
FIG. 1 illustrates a network architecture of an embodiment of a communications system for supporting M2M communication.

The making and using of the embodiments are discussed in details below. It should be appreciated, however, that the present disclosure provides many applicable inventive concepts that can be embodied in a wide variety of specific contexts. The specific embodiments discussed are merely illustrative of specific ways to make and use the invention, and do not limit the scope of the invention.

One consideration when designing M2M networks is the capability of handling large numbers of devices (e.g., as many as 30,000 devices in a cell). A large number of M2M devices may be configured to monitor environmental parameters (e.g., temperature, pressure, stress, etc.), and some of those M2M devices (e.g., Smart Meters) may be configured to report data in response to a triggering event or condition. In fact, relatively large numbers of M2M devices may be triggered to report data by common triggering events or conditions (e.g., an earthquake, etc.), which may give rise to potential "traffic burst" scenarios.

Traffic burst scenarios may be exacerbated by the contentious manner in which M2M devices access uplink channel resources. Specifically, M2M devices secure uplink channel reservations via a competitive ranging process, which is initiated by transmitting a ranging code in a random timeslot of a ranging channel. When two devices transmit their ranging code in the same timeslot, a collision occurs such that neither ranging code transmission is transported to the base station (BS). Consequently, the ranging channel resource (i.e., the timeslot) is essentially wasted, and the devices involved in the collision may need to re-attempt their ranging code transmissions in order to secure an uplink reservation.

During periods of high contention (e.g., traffic burst scenarios), collisions may occur in many of the available timeslots, therefore requiring significant numbers of contending M2M devices to engage in reattempts/retries (e.g., 2, 3, 4, or more) before successfully transmitting their respective ranging codes to the BS. Affected M2M devices may experience greater latency in their uplink data transmissions as well as high power consumption. Hence, high contention in the ranging channel not only wastes network resources but also affects the quality of service (QoS) in the M2M network.

One solution for dealing with congestion in the ranging channel is to divide the ranging channel into sub-channels, and then allocate the ranging sub-channels to groups of M2M devices. Such clustering techniques are explained in IEEE 802.16 publication C80216p-11_0009 entitled "Priority access for network entry/re-entry of a large number of M2M devices," and IEEE 802.16 publication C80216p-11_0034 entitled "Group-based Allocation of Random Access Resources," both of which are incorporated herein by reference as if reproduced in their entireties. The effectiveness of such clustering techniques are limited because it is generally difficult to group (or cluster) M2M devices in an efficient manner. Specifically, it may be quite difficult to accurately project when individual M2M devices will transmit ranging requests or ranging codes, and therefore may be impossible to cluster M2M devices in an efficient manner. When M2M devices are not clustered efficiently, traffic may not be evenly distributed over the ranging sub-channels. For instance, many M2M devices in a first group may simultaneously attempt to access an assigned ranging sub-channel while (at the same time) few M2M devices in a second group attempt to access a second ranging sub-channel, thereby producing a situation where the first ranging channel is over-utilized (high contention) while the second ranging channel is under-utilized (little or no contention). Due to the above discussed vulnerabilities of prior art clustering techniques, a more efficient way of managing M2M device ranging requests is desired.

An alternative (or supplementary) technique to clustering M2M devices may be to allocate additional bandwidth to the ranging channel during periods of high-contention. For instance, a BS may allocate additional bandwidth to the ranging channel during periods of high contention, and then subsequently de-allocate some or all of that additional bandwidth once the contention levels have subsided. The additional bandwidth may generally be re-allocated from another channel (e.g., the uplink channel). Additionally or alternatively, the BS may alleviate contention in the ranging channel by revoking the ranging channel privileges of some contending devices for a period of time (e.g., until the high-contention condition has subsided).

In order to effectively re-allocate bandwidth and/or revoke ranging channel privileges to reduce contention in the ranging channel, the BS may first need to identify contention levels in the ranging channel. Specifically, re-allocating bandwidth to the ranging channel may reduce available resources in the uplink channel, and hence may be desirable only when necessary to alleviate contention in the ranging channel. Likewise, restricting ranging channel access through the revocation of ranging channel privileges may be undesirable unless doing so is helpful in reducing contention in the ranging channel.

Gauging contention in the ranging channel may be difficult from the BS's perspective. In some implementations/scenarios, the BS may be unable to distinguish empty timeslots (i.e., timeslots in which no ranging code was transmitted) from timeslots in which a collision occurred (referred to herein as "collision timeslots") because the BS may perceive both empty timeslots and collision timeslots as noise, and therefore may be unable to distinguish between the two. In such implementations, the BS may only be capable of distinguishing timeslots carrying a successful ranging code transmission from timeslots that do not carry a successful ranging transmission, but may be unable to determine whether timeslots not carrying a successful ranging transmission are the result of a collision or are simply empty (e.g., no ranging code transmission was attempted). In other implementations/ scenarios, the BS may be capable of discerning collided timeslots from empty timeslots, but may be incapable of determining how many attempted transmissions occurred in a collided timeslot. For instance, the BS may be unable to determine whether only two ranging code transmission collided in the timeslot, or (alternatively) whether three or more ranging code transmission collided in the timeslot. This concept may be more clearly understood with reference to FIG. 11, which shows the fraction of timeslots carrying successful transmissions is about the same when forty contending devices are competing for sixty timeslots as when eighty contending devices are competing for sixty timeslots.

Embodiments described herein may address this problem by allowing the BS to more accurately estimate the number of competing devices in the ranging channel based on the ranging retries information communicated by at least some of the contending M2M devices. The ranging retries information may specify the number of retries an M2M device performs in a current ranging session, and when considered collectively may allow the BS to more accurately gauge the number of competing devices in the ranging channel. Accordingly, the BS may roughly predict the level of contention in the ranging channel based on the ratio of the estimated number of contending devices in the ranging channel to the number of available timeslots in the ranging channel.

Specifically, the number of collisions (or the likelihood of a collision) in the ranging channel may increase in a non-linear fashion as the number of contending devices in the ranging channel increases (assuming the number of available timeslots is static). Likewise, the average number of ranging code transmission attempts before a successful ranging code transmission may vary as a function of the ratio of contending devices to available timeslots. Hence, the BS may estimate the total number of contending devices based on the number of available ranging timeslots, the number of successful ranging code transmissions, and the reported number of retries from a subset of the devices. The mathematical relationship between the total number of contending devices, the number of available ranging slots, the total number of successful ranging code transmissions, and the reported number of retries from a subset of the devices may be determined by applying common statistical principles. Thereafter, the BS may be able to intelligently decide when to allocate/de-allocate bandwidth to/from the ranging channel, or alternatively when to remove/re-introduce contending devices to/from the ranging channel.

FIG. 1 illustrates a network 100 for supporting M2M communication. The network 100 may comprise a BS 110, a plurality of M2M devices 121-124, a core network 130, and a storage server 140. The BS 110 may be any device or component (e.g., cell tower, etc.) that is capable of establishing and/or facilitating the establishment of wireless communication between a pair of M2M devices 121-124, or that is capable of providing network access to one or more of the M2M devices 121-124. The M2M devices 121-124 may be any device or component capable of transmitting and/or receiving wireless signals (e.g., ranging requests, uplink transmissions, etc.) in the network 100 without being prompted by a user. For instance, one or more of the M2M devices 121-124 may be Smart Meters configured to report measurements (e.g., pressure, temperature, etc.) upon the occurrence of a triggering event (e.g., earthquake, etc.). In the same or other embodiments, one or more of the M2M devices 121-124 may be an autonomous application installed in a user equipment (UE), such as global positioning system (GPS) application, etc. The core network 130 may be any network (wireless, wire-line, or hybrid) that is capable of transporting a communication signal from the BS 110 to the storage server 140. The storage server 140 may be any device configured to store and/or process M2M transmissions from one or more of the M2M devices 121-124. In some embodiments, the storage server 140 may be a memory or processing module on a M2M device.

In order to make an uplink transmission, the M2M devices 121-124 may be required to reserve an uplink channel resource. This uplink resource may be reserved by transmitting a ranging request (e.g., a random code) in a ranging channel, which may be a contention channel that is separate from the uplink channel. If only one of the M2M devices 121-124 attempts to access a ranging channel resource (e.g., a timeslot), then the corresponding ranging request may be transported over the ranging channel to the BS 110 without contention. However, if two or more of the M2M devices 121-124 attempt to access the same contention channel resource (e.g., the same timeslot), then their respective ranging requests may collide and, as a result, neither of the ranging requests will be received by the BS 110. For instance, if the M2M devices 121 and 123 transmit their ranging requests at the same time, then their ranging request may collide (as indicated by the lightning bolt in FIG. 1). If a collision occurs, then the M2M device may re-transmit the random code in the ranging channel, which may be referred to herein as a retry or re-attempt. The M2M devices 121-124 may listen for an acknowledgment message from the BS 110 to determine if their ranging code transmission was successful. If an acknowledgement message is not detected before a timeout, the M2M devices 121-124 may conclude that their ranging code collided with another ranging code, and may thereafter re-attempt their ranging code transmissions. To prevent successive collisions with the same M2M device, ranging code transmission re-attempts may be made in randomly selected timeslots.

After one or more re-attempts, the ranging code transmission may be received by the BS 110, who may return an acknowledgment message, e.g., a code division multiple access (CDMA) allocation information element (IE). Upon receiving the acknowledgment message, the M2M device may return a ranging request. In response to the ranging request, the BS may send a ranging response message that identifies an uplink resource that has been allocated to the requesting M2M device. Ranging codes may comprise a random code that may be used by the M2M device to identify the acknowledgement message. Ranging codes may be chosen from a list of random codes. In some embodiments, a M2M device may use the same ranging code for subsequent retries (e.g. the second attempt, etc.) of a ranging code session. In other embodiments, a different ranging code may be used for each retry of a ranging session.

FIG. 2 illustrates an example of a WiMAX compliant communications system 200 for supporting M2M communication. The WiMAX compliant communications system 200 includes a plurality of WiMAX devices 205, 210, and 212, a non-WiMAX device 215, a mobile network operator (MNO) 220, and an M2M subscriber 230. The WiMAX devices 205, 210, and 212 may be capable of communicating via the IEEE 802.16 and/or IEEE 802.16m protocols. The non-WiMAX device 215 may be incapable of communicating via the IEEE 802.16 and/or IEEE 802.16m protocols, and consequently may communicate with the WiMAX compliant communications system 200 via an intermediary WiMAX device 212. Further, the WiMAX devices 210 and 212 and the non-WiMAX device 215 may be capable of engaging in M2M communication, while the WiMAX device 205 may be a subscriber station (SS) and/or a mobile station (MS) (e.g., a cell phone, etc.). In some embodiments, the WiMAX device 205 may comprise M2M applications, e.g., GPS, etc.

The MNO 220 may be used to aggregate information from the M2M devices and provide the information (aggregated or not aggregated) to an M2M subscriber 230. The MNO may comprise an access service network/interface 221 and a connectivity service network/interface 222. The access service network/interface 221 may comprise a WiMAX BS 223, which may provide network access to the WiMAX devices 202, 210, and 212. The connectivity service network/interface 222 may comprise an M2M server 224 that provides network access to the M2M subscriber 230. The M2M subscriber 230 may be a storage and/or processing device for M2M data, e.g., a server.

Figure 3:
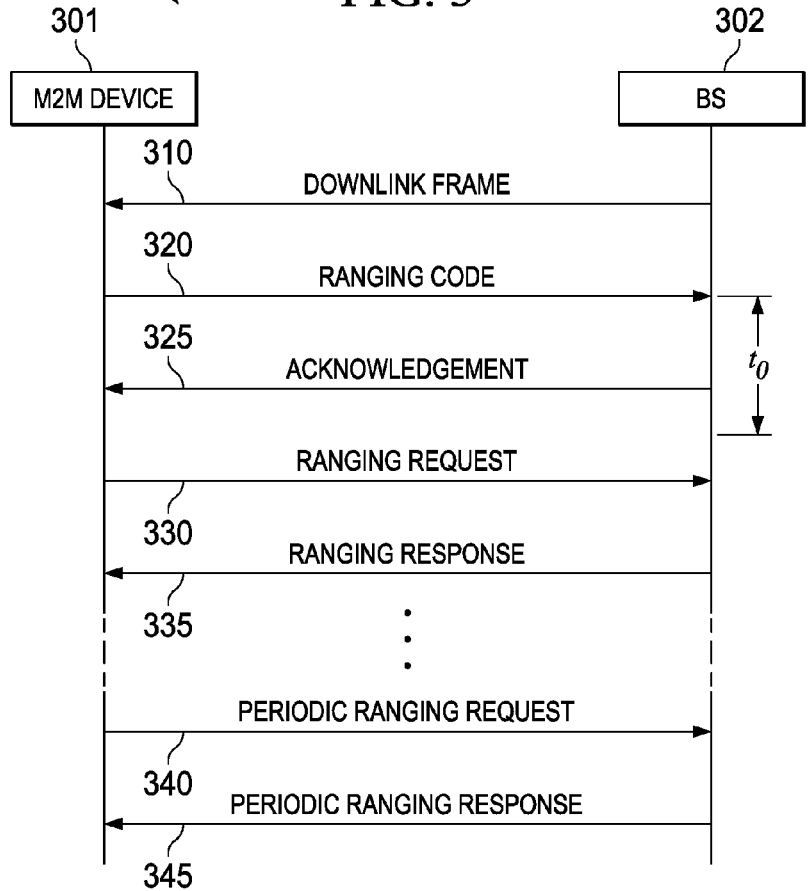
FIG. 3 illustrates a protocol diagram of an embodiment for communicating ranging retries information.

FIG. 3 illustrates an embodiment of a protocol diagram 300 for communicating ranging retries information, which may be implemented between an M2M device 301 and a BS 302. The protocol 300 may begin with a downlink frame transmission 310 from the BS 302 to the M2M device 301, which may identify available timeslots in the ranging channel. Upon identifying the available timeslots, the M2M device may transmit a ranging code 320 to the BS 302. The ranging code 320 may be transmitted upon entry or re-entry into the network, as part of a handover procedure. In some instances, the ranging code 320 may be preceded by one or more failed ranging code transmission attempts by the M2M device 301. In response to receiving the ranging code transmission 320, the BS 302 may send an acknowledgement message 325 to the M2M device 301, which may acknowledge receipt of the ranging code 320 as well as notify the device of a CDMA allocation ID.

If the acknowledgement message 325 is received before a timeout period ($t_0$), the M2M device 301 may send a ranging request 330 to the BS 302, which may notify the BS 302 of the M2M device's 301 media access code (MAC) address. The ranging request message 330 may be referred to as a ranging request (RNG-REQ) message in legacy WiMAX networks, or as an air-to-air (AAI) ranging request (AAI-RNG-REQ) in WiMAX Advanced networks. The ranging request 330 may comprise one or more parameters or fields that convey information to the BS 302, including one or more parameters or fields that contain ranging retries information. Ranging retries information may specify the number of times the M2M device 301 attempted to transmit a ranging code in the ranging channel. In response to receiving the ranging request message 330, the BS 302 may send a ranging response message 335 to the M2M device 301, which may acknowledge receipt of the ranging request message 335. In some embodiments, the M2M device 301 and the BS 302 may exchange additional periodic ranging requests 340 and periodic ranging responses 345, e.g., as needed to establish synchronization in the uplink channel. The ranging retries information may be included in any of the subsequent ranging requests 340 instead of, or in addition to, being included in the ranging request message 330. In some embodiments, the ranging retries information may only be included in a ranging request when ranging retries information is queried by the BS 302, e.g., in a previously received acknowledgement message or ranging response message.

FIG. 4 illustrates an embodiment of a ranging request message 400, which may be a RNG-REQ message as used in legacy WiMAX networks. The ranging request message 400 may comprise a header 410 and one or more type-length-value (TLV) fields 420 (as well as other information). The header 410 may uniquely identify the ranging request message 400 as a ranging request, and may (optionally) include information about the M2M device sending the request and/or information about the BS receiving the request. The TLVs field 420 may comprise one or more TLV encodings, each of which may specify a different ranging parameter. One of the TLV encodings in the TLV fields 420 may be a ranging retries TLV 430 comprising a ranging retries parameter that specifies the number of ranging attempts made by the M2M device during a current ranging attempt or ranging session.

FIG. 5 illustrates a ranging retries TLV 500, which may be included in a RNG-REQ message as used in legacy WiMAX networks. The ranging retries TLV 500 may be similar to the ranging retries TLV 430, and may comprise a type field 532, a length field 534, and a value field 536. The type field 532 may be set to an integer value that identifies the ranging retries TLV 500 as a ranging retries parameter. For instance, the type field 532 may be set to twenty-eight to identify the ranging retries TLV 500 as a ranging retries parameter. The length field 534 may specify the length (in bytes) of the ranging retries TLV 500, and may be set to one to indicate that the ranging retries TLV is one byte long. The value field 536 may comprise a two bit value that specifies the number of ranging retries in the current ranging process. For instance, the value field 536 may be set to 00 to indicate that the current ranging attempt was successful on a first attempt, to 01 to indicate that the current ranging attempt was successful on a second attempt, to 10 to indicate that the current ranging attempt was successful on a third attempt, or to 11 to indicate that the current ranging attempt was successful on a fourth attempt. The value settings in the embodiments as discussed, such as the value field 536 settings, may be used as independent embodiments for each single value setting or any combination of two or more of the single value settings that may come up.

FIG. 6 illustrates an embodiment of a ranging request message 400, which may be an AAI-RNG-REQ message as used in WiMAX Advanced networks. The ranging request message 600 may comprise a header 610 and one or more AAI-RNG-REQ fields 620 (as well as other information). The header 610 may uniquely identify the ranging request message 600 as a ranging request, and may (optionally) include various information about the M2M device sending the request and/or the BS receiving the request. The AAI-RNG-REQ fields 620 may comprise one or more fields that specify different ranging parameters, one of which may comprise a retries field 630 specifying the number of failed trials in a current ranging process or session. In an embodiment, the retries field 630 may comprise a two bit value that is set to 00 to indicate that the current ranging attempt was successful on a first attempt, to 01 to indicate that the current ranging attempt was successful on a second attempt, to 10 to indicate that the current ranging attempt was successful on a third attempt, or to 11 to indicate that the current ranging attempt was successful on a fourth attempt. In an embodiment, the retries field 640 may be included in an initial ranging request message by an M2M device after network entry or re-entry, in a periodic ranging request, or in a handover ranging request.

FIG. 7 illustrates a flowchart of an embodiment of a method 700 for managing contention in a ranging channel. The method may begin at step 710, where a BS may set an identifier (N) to zero. Next, the method 700 may proceed to step 720, where the BS may receive a ranging code from a $Device_N$ (e.g., the $Device_0$ during the first iteration). Next, the method 700 may proceed to step 725, where the BS may send an acknowledgement message to the $Device_N$. Next, the method 700 may proceed to step 730, where the BS may receive a ranging request from the $Device_N$. The ranging request may comprise ranging retries information. Next, the method 700 may proceed to step 740, where the BS may store the ranging retries information received in step 730, as well as respond to the ranging request by sending a ranging response to the $Device_N$. Next, the method 700 may proceed to step 750, where the BS may determine whether a stop condition has been reached. A stop condition may signify that enough ranging retries information has been collected to sufficiently accurately estimate the number of contending devices in the ranging channel. The stop condition may be satisfied by obtaining ranging retries information from a minimum number of devices (e.g., ten M2M devices, twenty M2M devices, etc.), or by fulfilling any other condition that ensures a statistically significant amount of ranging retries information has been collected. In some embodiments, the stop condition may be omitted entirely, and the BS may continuously update the estimated contention indicator.

If a stop condition has not been reached, then the method 700 may proceed to step 755, where N may be incremented (e.g., by about one). Thereafter, the method 700 may repeat steps 720-750 for additional contending devices (e.g., $Device_1$, $Device_2$ ... $Device_{N-1}$, $Device_N$) until the stopped condition is reached.

Once a stop condition is reached, the method 700 may proceed to step 760, where the BS may estimate a contention indicator based on the ranging retries information collected for $Device_0$ through $Device_N$. A contention indicator may comprise any metric that indicates a degree of contention in the contention channel. For instance, the contention indicator may comprise an estimated ratio of contending devices to available timeslots, an estimated number of contending devices in the ranging channel, a projected or average number of retries before successful transmission, a distribution of ranging code transmission failures before a successful ranging code transmission is achieved or any other metric (or combination of metrics) that may be used independently or collectively) to gauge an approximate level of contention in the ranging channel. In an embodiment, a sufficiently accurate estimation of the contention indicator may require that only a portion of the contending devices in the ranging channel report retries information, and therefore it is not necessary for all contending devices to report ranging retries information.

In an embodiment, the contention indicator determined in step 760 may comprise a ratio of contending devices to available timeslots. In other embodiments, the contention indicator determined in step 760 may comprise a distribution of failures before achieving a successful ranging code transmission. For instance, the BS may determine how many devices failed once, twice, etc. before achieving a successful ranging code transmission. In such embodiments, this distribution may be indicative of contention in the contention channel. For instance, if a significant number of contending devices were required to make three or more retries, then the BS may determine that contention in the ranging channel is too high. Alternatively, if only a few devices were required to make three or more retries, then the BS may determine that contention in the ranging channel is too low. In some embodiments, an ideal or desirable distribution may be determined by a network operator, and may comprise a certain number or range of first transmission attempt successes, a certain number or range of second transmission attempt successes, a certain number or range of third transmission attempt successes, and/or a certain number or range of forth (or higher) transmission attempt successes.

Next, the method 700 may proceed to step 780, where the BS may determine whether the contention indicator is within an acceptable range. If not, the method 700 may proceed to step A, where appropriate adjustments will be made to bring the contention indicator within the acceptable range. Otherwise, the method 700 may revert back to step 710, where the ranging channel contention may be re-evaluated. In some embodiments, a time delay ($t_d$) may be implemented before the ranging channel contention is re-evaluated, such that the evaluation takes place periodically (or semi-periodically), rather than continuously. Additionally or alternatively, ranging channel contention may be re-evaluated upon observing an event that suggests a traffic burst scenario (or, on the other hand, an event that suggests a decrease in ranging channel contention), such as a sudden increase (or decrease) in the number of ranging codes received in the ranging channel. FIG. 8 illustrates a flowchart of an embodiment of a method 800 for adjusting ranging channel bandwidth to bring the contention indicator (e.g., the ratio of contending devices to available timeslots, or another metric) within the acceptable range. The method 800 may start at step 810, where a BS will determine whether the contention indicator is too high or too low. In an embodiment, the contention indicator may be too high when said indicator exceeds an upper threshold. In the same or other embodiments, the contention indicator may be too low when said indicator fails to exceed a lower threshold.

If the contention indicator is too high (or the distribution of failures before successful ranging code transmission suggests that there is too much contention in the ranging channel), then the method may proceed to step 820, where the BS may re-allocate bandwidth from an uplink channel to the ranging channel. Conversely, if the contention indicator is too low, then the method may proceed to step 830, where the BS may re-allocate bandwidth from the ranging channel to the uplink channel. In an embodiment, the contention indicator may comprise a distribution of failures before successful ranging code transmission. In such embodiments, the contention indicator may be compared with other distributions (e.g., ideal or adequate distributions) to determine whether there is too much (or too little) contention in the ranging channel. The amount of bandwidth that is re-allocated may be enough to adjust the contention indicator to a desired level. For instance, if the contention indicator comprises a ratio of contending devices to available timeslots, then a 1:1 ratio, or some other ratio as determined by a network administrator may be considered optimal or desirable. After adjusting the contention indicator to the desired level in step 820 or 830, the method 800 may proceed to step B, where the ranging channel may be re-evaluated (e.g., as illustrated in FIG. 7).

FIG. 9 illustrates a flowchart of another embodiment of a method 900 for bringing the contention indicator within the acceptable range. Unlike the method 800, the method 900 may adjust the number of contending devices (rather than the number of available timeslots) to bring the contention indicator within an acceptable range. The method 900 may begin at step 910, where a BS will determine whether the contention indicator is too high or too low.

If the contention indicator is too high, then the method may proceed to step 920, where the BS may select one or more contending devices to remove from the ranging channel. Removing a contending device from the ranging channel may comprise revoking the device's ranging channel privileges indefinitely or at least for a minimum or pre-determined period of time. The devices whose ranging channel privileges are revoked may be selected based on some criteria. For instance, devices may be prioritized based on their service agreement (e.g., price level), or even by the relative importance of their up-link transmissions, e.g., early-warning devices may be given priority over inventory reporting devices. After the devices are selected in step 920, the method 900 may proceed to step 925, where the BS may notify the selected devices that their ranging channel privileges have been revoked.

If the contention indicator is too low, then the method 900 may proceed to step 930, where the BS may select devices to re-introduce into the ranging channel. Re-introducing devices into the ranging channel may comprise re-instating previously revoked ranging channel privileges, or migrating devices to the instant ranging channel from another ranging channel or sub-channel. After the devices are selected in step 930, the method 900 may proceed to step 935, where the BS may notify the selected devices that their ranging channel privileges have been re-instated. After adjusting the contention indicator to the desired level in steps 920-925 or steps 930-935, the method 900 may proceed to step B, where the ranging channel may be re-evaluated (e.g., as illustrated in FIG. 7).

In some embodiments, ranging channel contention may be adjusted by a proportional-integral-derivative (PID) controller, or other similar feedback controllers. In such embodiments, a method similar to that described above may be performed continuously (e.g., without a stop condition).

Figure 10:
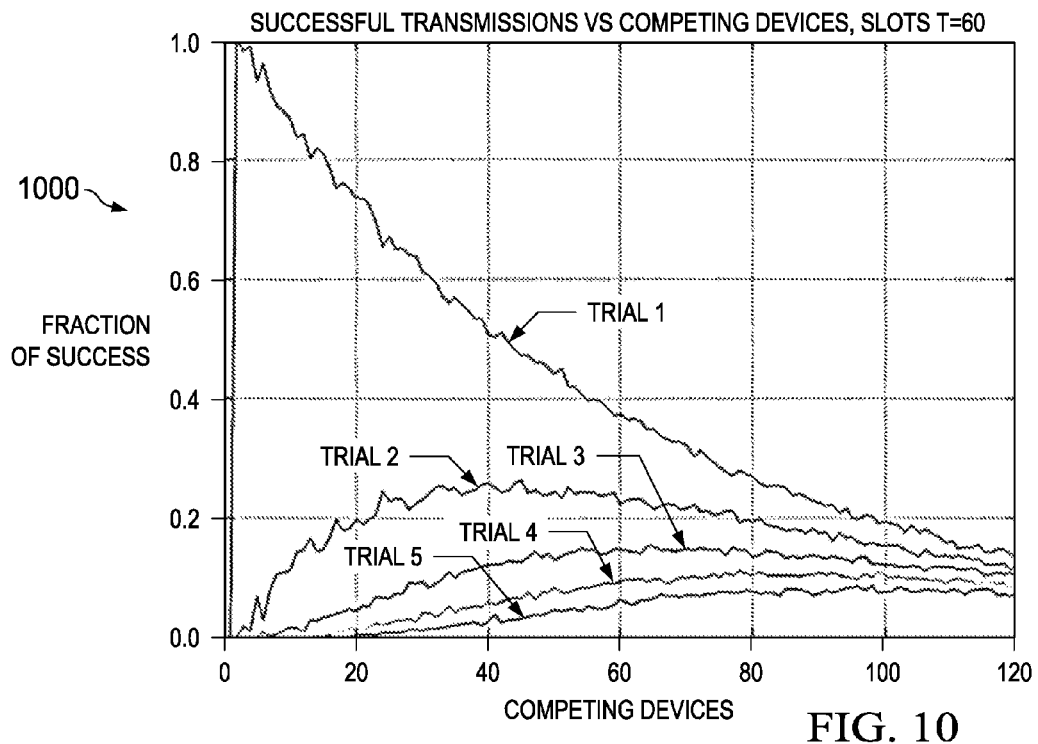
FIG. 10 illustrates a graph of a simulation results.

FIG. 10 illustrates a graph of a simulation 1000 that shows the fraction of successful first attempts, second attempts, third attempts, fourth attempts, and fifth attempts as the number of competing devices in a ranging channel having about sixty timeslots is increased from 1 to 120. Notably, the first-attempt success rate decreases as the number of competing devices in the ranging channel increases, thereby indicating an increase in the amount of contention in the ranging channel. Conversely, the second-attempt success rates increase initially (as the number of second-attempts increases as a result of failed first attempts), and then begin to decrease as contention in the ranging channel increases. This characteristic is also exhibited in the third, fourth, and fifth attempt success rates.

Figure 11:
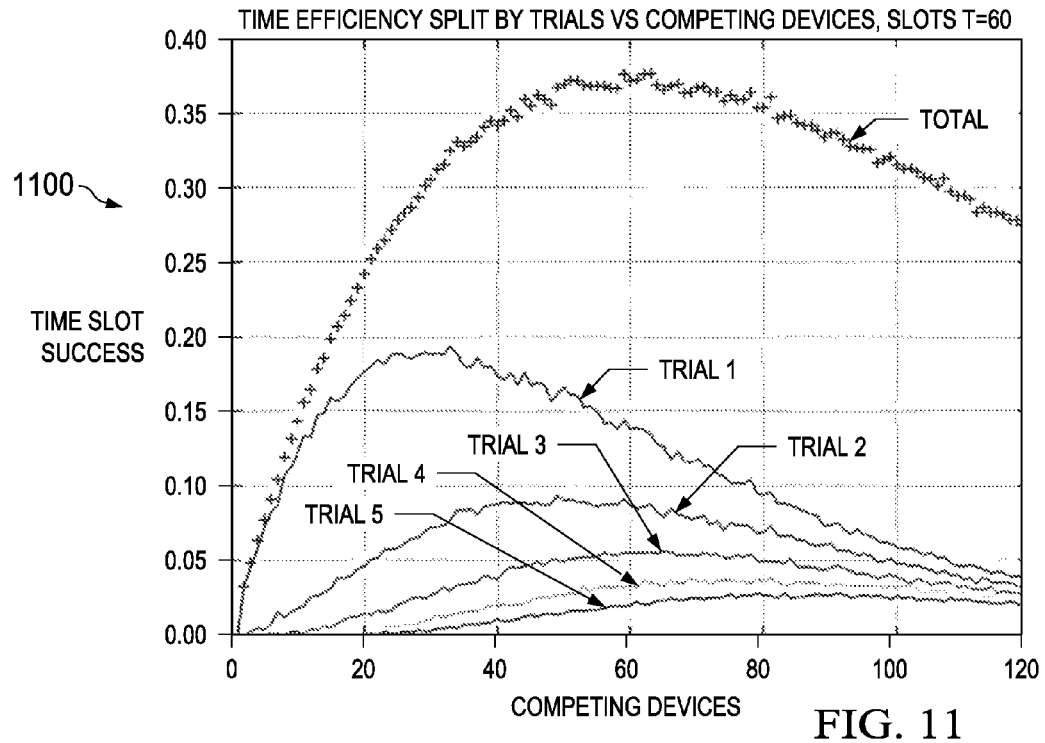
FIG. 11 illustrates another graph of a simulation results.

FIG. 11 illustrates a graph 1100 of a simulation showing the fraction of timeslots that carry a successful ranging code transmission attempt from the perspective of the BS as the number of competing devices in a ranging channel having about sixty timeslots is increased from one device (i.e., a 1:60 ratio) to one-hundred and twenty devices (i.e., a 2:1 ratio). The graph 1100 also shows how the successful ranging code transmissions break down in terms of first, second, third, fourth, and fifth ranging code transmission attempts, although such breakdown would only be perceivable by the BS when ranging retries information is collected. As shown, the fraction of timeslots carrying a successful ranging code transmission (as demonstrated by the X-line) peaks at about sixty devices (i.e., a 1:1 ratio). Notably, the number of timeslots carrying a successful ranging code transmission (as perceived by the BS) is essentially the same when forty contending devices are present (i.e., a 2:3 ratio), as well as when eighty competing devices are present (i.e., a 3:4 ratio). Hence, without the ranging retries information, the BS may be unable to distinguish between high and low levels of contention in the ranging channel.

From a network perspective, the amount of network bandwidth allocated to the ranging channel may be optimal when there is approximately a 1:1 ratio of contending devices to available timeslots, e.g., or when there are about sixty devices contending for about sixty timeslots. Notably, there is not a one-hundred percent first-attempt success rate for the 1:1 ratio because the devices access ranging channel resources in a random fashion. Specifically, it is unlikely that each of the sixty contending devices will randomly select a different one of the sixty random timeslots. Instead, it is likely that at least some of the sixty contending devices will attempt to access the same timeslots, while other available timeslots will remain empty. However, some contention may be acceptable to ensure the best utilization of network resources (e.g., to prevent too much uplink bandwidth from being allocated to the ranging channel).

Conversely, from the perspective of the M2M devices, lower ratios of contending devices to available timeslots (e.g., 2:3, 1:2, etc.) are preferable so far as they result in less latency and less power consumption. Specifically, M2M devices may need to ramp up power each time a ranging code transmission attempt is made, and therefore additional attempts may deplete battery resources. Network operators may balance the various interests involved when selecting an acceptable range for the ratio of contending devices to available timeslots. For instance, in a relatively crowded network that has many devices, a network administrator may select a slightly higher range of acceptable ratios (e.g., 1:1<ratio<4:3) to ensure that uplink channel resources are utilized efficiently, even though doing so may increase ranging latency and device power consumption. Alternatively, in a relatively un-crowded network (or a network where power conversation and/or low-latency is a priority), an administrator may select a slightly lower range of acceptable ratios (e.g., 3:4<ratio<1:1), even though doing so may under-utilize network bandwidth.

Figure 12:
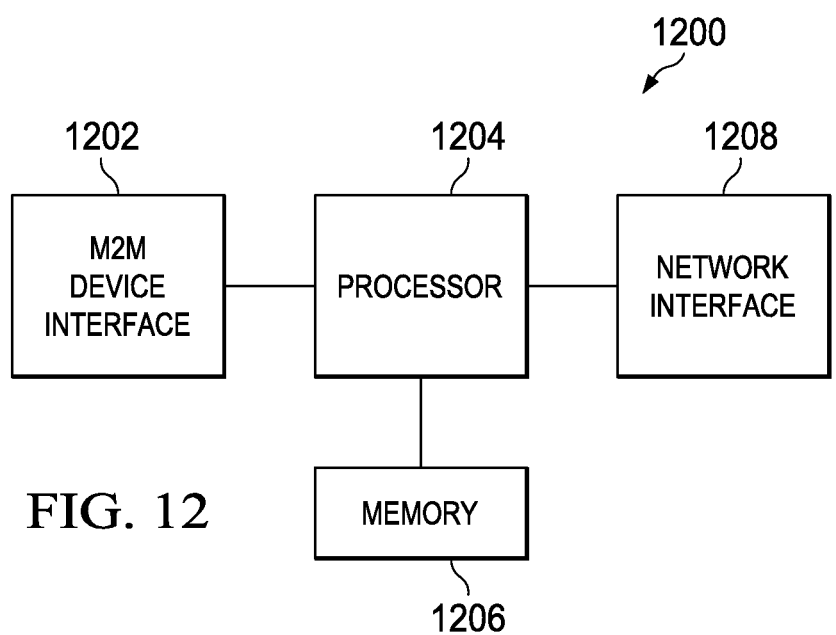
FIG. 12 illustrates a high-level circuit diagram of an embodiment of a BS.

FIG. 12 illustrates a high-level circuit diagram of an embodiment of a BS 1200 for controlling contention in a ranging channel. The BS 1200 may include an M2M device interface 1202, a processor 1204, a memory 1206, and a network interface 1208, which may be arranged as shown in FIG. 12. The M2M device interface 1202 may be any component or collection of components that allows the BS 1200 to communicate with one or more of the M2M devices. The processor 1204 may be any component capable of performing computations and/or other processing related tasks, and the memory 1206 may be any component capable of storing data and/or programming instructions for execution by the processor 1204. In an embodiment, the memory 1206 may store programming instructions for estimating the ratio of contending devices to available timeslots based on retrial information, as well as any other BS related tasks described herein. In an embodiment, the network interface 1208 may be any component or collection of components that allows the BS 1200 to communicate M2M information over a network, e.g., to a server or M2M subscriber. The BS 1200 may be a standalone device positioned in a remote location, or as a unit or module of an MNO.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus for managing contention in a communications system, the apparatus comprising:
  a processor; and
  a non-transitory computer readable storage medium storing programming for execution by the processor, the programming including instructions to:
  receive a ranging code from a device in a ranging channel, wherein the ranging code corresponds to a current ranging attempt;
  broadcast a message acknowledging reception of the ranging code;
  receive a ranging request message from the device, wherein the ranging request message comprises a ranging retries parameter that specifies a number of ranging retries that the device performed during the current ranging attempt; and
  estimate a distribution of failures before successful ranging code transmission based at least in part on the ranging retries parameter,
  wherein the distribution of failures before successful ranging code transmission comprises a first percentage of contending devices that succeeded on a first ranging code transmission attempt, and one or more of a second percentage of contending devices that succeeded on a second ranging code transmission attempt, a third percentage of contending devices that succeeded on a third ranging code transmission attempt, and a fourth percentage of contending devices that succeeded after the third ranging code transmission attempt.

2. The apparatus of claim 1, wherein the programming further includes instructions to:
estimate a number of contending devices in the ranging channel based at least in part on the ranging retries parameter.

3. The apparatus of claim 2, wherein the programming further includes instructions to:
allocate additional bandwidth to the ranging channel when the estimated number of contending devices in the ranging channel exceeds an upper threshold.

4. The apparatus of claim 2, wherein the programming further includes instructions to:
de-allocate bandwidth from the ranging channel when the estimated number of contending devices in the ranging channel is less than a lower threshold.

5. The apparatus of claim 2, wherein the programming further includes instructions to:
reduce the number of contending devices by revoking or modifying ranging channel privileges of one or more of the contending devices when the estimated number of contending devices in the ranging channel exceeds an upper threshold.

6. The apparatus of claim 1, wherein the ranging retries parameter specifies that the device attempted three or more ranging retries during the current ranging attempt.

7. The apparatus of claim 6, wherein the ranging retries parameter specifies that the device attempted three ranging retries during the current ranging attempt.

8. The apparatus of claim 6, wherein the ranging retries parameter specifies that the device attempted more than three ranging retries during the current ranging attempt.

9. A method for managing contention in a communications system, the method comprising:
receiving, by a base station, a ranging request message from a device, wherein the ranging request message comprises a ranging retries parameter that specifies a number of ranging retries that the device performed during a current ranging attempt; and
estimating a distribution of failures before successful ranging code transmission based at least in part on the ranging retries parameter, wherein the contention indicator is indicative of a level of contention in a ranging channel, wherein the distribution of failures before successful ranging code transmission comprises a first percentage of contending devices that succeeded on a first ranging code transmission attempt, and one or more of a second percentage of contending devices that succeeded on a second ranging code transmission attempt, a third percentage of contending devices that succeeded on a third ranging code transmission attempt, and a fourth percentage of contending devices that succeeded after the third ranging code transmission attempt.

10. The method of claim 9 further comprising:
estimating a contention indicator based at least in part on the ranging retries parameter; and
allocating additional timeslots to the ranging channel when the contention indicator exceeds an upper threshold.

11. The method of claim 9 further comprising:
estimating a contention indicator based at least in part on the ranging retries parameter; and
de-allocating timeslots from the ranging channel when the contention indicator fails to exceed a lower threshold.

12. The method of claim 9 further comprising:
estimating a contention indicator based at least in part on the ranging retries parameter; and
reducing the number of contending devices by revoking ranging channel privileges of one or more of the contending devices when the contention indicator exceeds an upper threshold.

13. The method of claim 9, wherein the ranging retries parameter specifies that the device attempted three or more ranging retries during the current ranging attempt.

14. The method of claim 13, wherein the ranging retries parameter specifies that the device attempted three ranging retries during the current ranging attempt.

15. The method of claim 13, wherein the ranging retries parameter specifies that the device attempted more than three ranging retries during the current ranging attempt.

* * * * *

UNITED STATES PATENT AND TRADEMARK OFFICE
CERTIFICATE OF CORRECTION

| | | |
|---|---|---|
| PATENT NO. | : 9,107,226 B2 | Page 1 of 1 |
| APPLICATION NO. | : 13/415279 | |
| DATED | : August 11, 2015 | |
| INVENTOR(S) | : George Calcev | |

It is certified that error appears in the above-identified patent and that said Letters Patent is hereby corrected as shown below:

On the Title Page, Item (75) Inventors, line 3, delete "Eric Colban" and insert --Erik Andreas Colban--.

Signed and Sealed this
Seventeenth Day of May, 2016

Michelle K. Lee
*Director of the United States Patent and Trademark Office*